(12) United States Patent
Davis et al.

(10) Patent No.: US 9,026,824 B2
(45) Date of Patent: May 5, 2015

(54) ESTABLISHING POWER SAVE MODE IN HYPERVISOR SYSTEM

(75) Inventors: Mark Charles Davis, Durham, NC (US); Liang Tang, Beijing (CN); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1631 days.

(21) Appl. No.: 12/264,368

(22) Filed: Nov. 4, 2008

(65) Prior Publication Data

US 2010/0115315 A1  May 6, 2010

(51) Int. Cl.
*G06F 1/32* (2006.01)
*G06F 9/455* (2006.01)

(52) U.S. Cl.
CPC ............ *G06F 1/3203* (2013.01); *G06F 1/3234* (2013.01); *G06F 1/3246* (2013.01); *G06F 1/3206* (2013.01); *G06F 9/45558* (2013.01); *G06F 2009/45575* (2013.01)

(58) Field of Classification Search
CPC ... G06F 1/3203; G06F 1/3206; G06F 1/3234; G06F 1/3246
USPC .......................................... 713/323, 320, 324
See application file for complete search history.

(56) References Cited

U.S. PATENT DOCUMENTS

| 7,543,166 | B2* | 6/2009 | Zimmer et al. | ................ 713/310 |
| 7,797,707 | B2* | 9/2010 | Cherkasova et al. | .......... 719/310 |
| 2007/0006227 | A1* | 1/2007 | Kinney et al. | ...................... 718/1 |
| 2007/0260761 | A1* | 11/2007 | Lu | ..................................... 710/8 |

* cited by examiner

*Primary Examiner* — Nimesh G Patel
(74) *Attorney, Agent, or Firm* — John L. Rogitz

(57) ABSTRACT

A hypervisor intercepts a reduced power mode call from a guest operating system (GOS) and executes reduced power scripts, prior to passing control back to BIOS for entry into the reduced power mode.

16 Claims, 3 Drawing Sheets

ESTABLISHING POWER SAVE MODE IN HYPERVISOR SYSTEM

FIELD OF THE INVENTION

The present invention relates generally to establishing power save modes for hardware in hypervisor-based computing systems.

BACKGROUND OF THE INVENTION

After periods of user inactivity, computers enter suspended states in which they are powered down (placed in "sleep mode") in reduced power configurations. In a computer implementing a hypervisor which controls one or more guest operating systems to establish respective virtual machines using a single hardware processor, however, the hypervisor may isolate a guest operating system in such a way as to complicate entry into the sleep mode. Part of this complication arises from a diskless environment in which Internet Small Computer System Interface (iSCSI) is not as fast as a real disk or as fast as the guest O.S. expects it to be, and the hypervisor needs to finish key processes before the hardware enters the sleep mode.

SUMMARY OF THE INVENTION

A system includes a processor executing a guest operating system (GOS) within a virtual machine. A hypervisor communicates with the GOS and is configured to intercept a sleep mode call therefrom. The hypervisor executes one or more reduced power scripts prior to passing control back to a physical BIOS associated with the processor for entry into a reduced power mode.

In example embodiments the GOS can include a power management module configured for generating the reduced power mode call, and the hypervisor can include a virtual BIOS module. In turn, the virtual BIOS module may include a virtual advanced configuration power interface (ACPI). Further, an example hypervisor can include a device manager module in a privileged domain of the hypervisor. The privileged domain communicates with the BIOS.

In another aspect, a method includes using a guest operating system (GOS) to initiate a signal for a computer system to enter a reduced power mode. The method contemplates intercepting a signal at a hypervisor and using the hypervisor to execute at least one reduced power script. Then, control of the system is passed from the hypervisor to BIOS of the system to configure the system in the reduced power mode.

In another aspect, a computer readable storage medium bears logic that can be executed by a processor for generating a reduced power mode signal in response to a period of user inactivity of a computer. The logic also includes intercepting the reduced power mode signal so that the computer cannot immediately enter the reduced power mode, and then using a hypervisor to execute control functions of the computer in preparation for entering the reduced power mode. Control of the computer is passed from the hypervisor after the control functions have been completed such that the computer can then and only then enter the reduced power mode.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
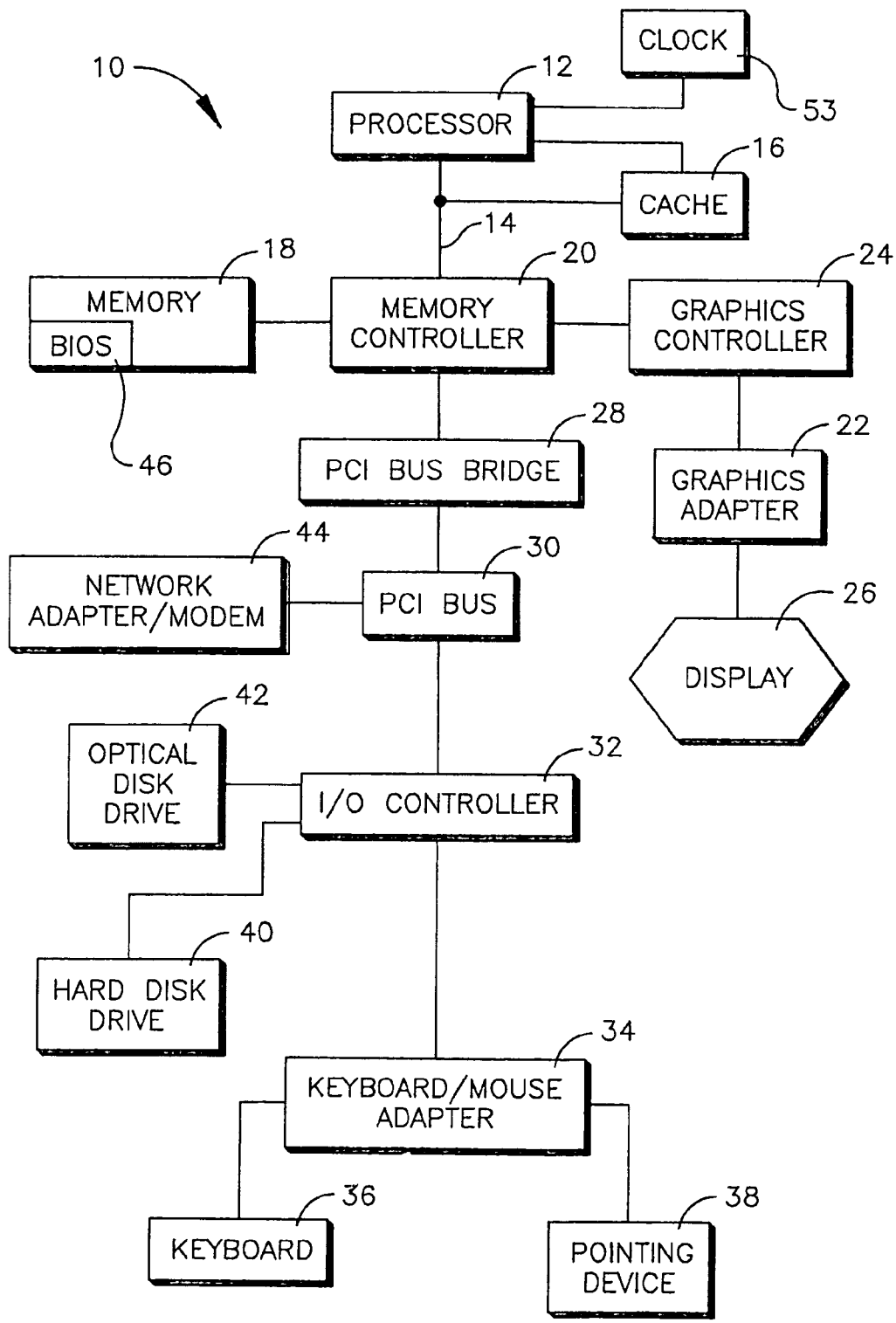
FIG. 1 is a block diagram of a non-limiting computer that can use the present invention.

Referring initially to FIG. 1, a high-level block diagram of a data processing system, generally designated 10, is shown in which the present invention may be implemented. The system 10 in one non-limiting embodiment is a personal computer or laptop computer or server computer or other computer configured for hypervisor operation. The system 10 includes a processor 12, which may be, without limitation, a Power PC™ processor available from Lenovo (or other processors common to the industry). The processor 12 typically is connected to a processor bus 14, and a cache 16, which is used to stage data to and from the processor 12 at reduced access latency, is also typically connected to the processor bus 14.

In non-limiting embodiments the processor 12 can access data from the cache 16 or from a system solid state memory 18 by way of a memory controller function 20. The cache 16 may include volatile memory such as DRAM and the memory 18 may include non-volatile memory such as flash memory. Also, the memory controller 20 may be connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 may be connected to the I/O controller 32, but in some implementations no physical HDD is implemented on the system 10 itself, and the processor 12 accesses a remote disk using iSCSI as though the remote disk were a local HDD.

As is known in the art, the HDD 40, whether local or remote, includes a controller that can access a master booth record (MBR) which can contain executable code as well as tabular data structures. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program 46 that may be stored in the memory 18, to load an operating system in the hard disk drive 40 into the memory 18. A clock 53 may be provided for timing purposes.

Figure 2:
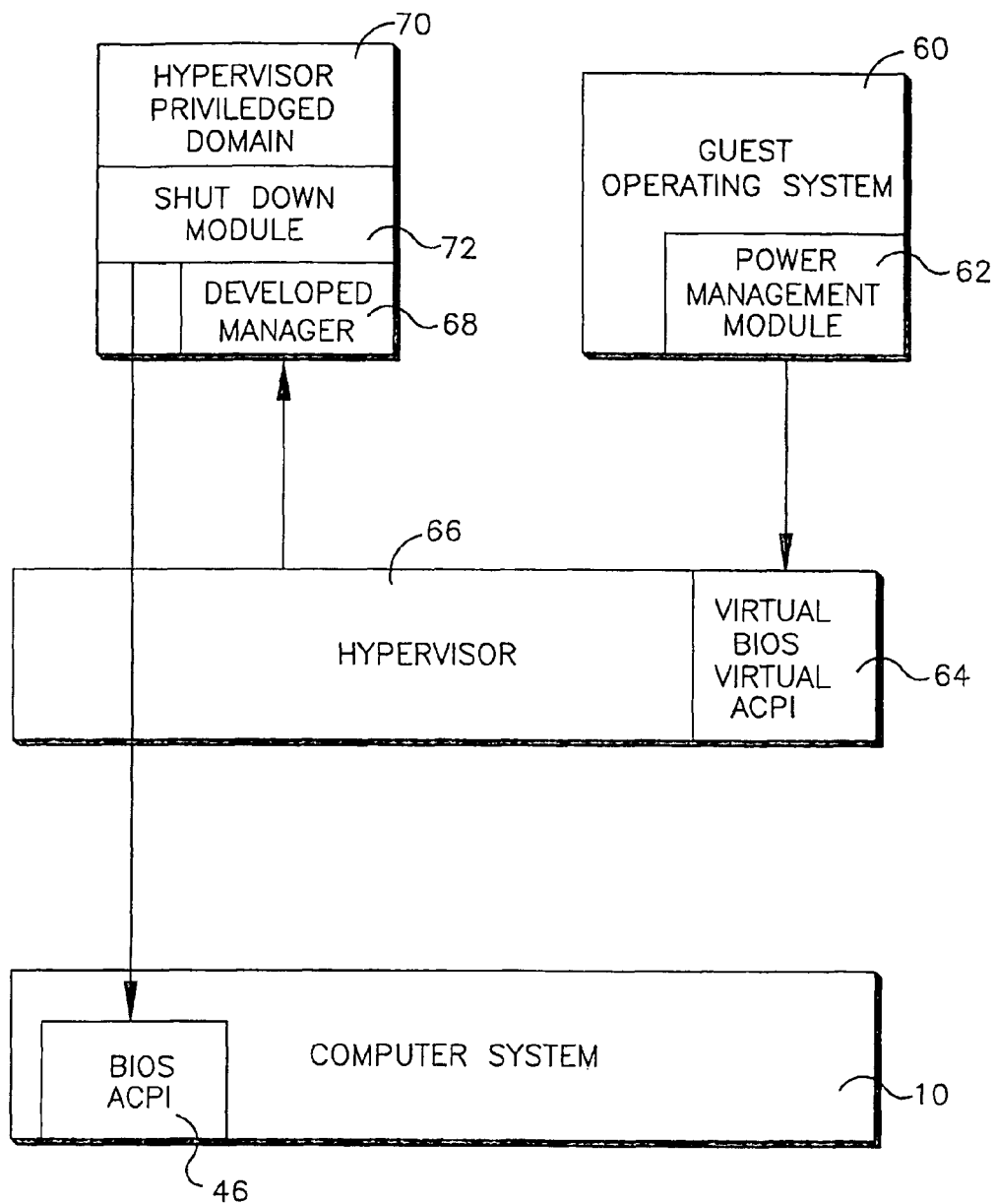
FIG. 2 is a block diagram of example software architecture.

Now referring to FIG. 2, an example software architecture is shown that uses a Type 1 hypervisor system, it being understood that present principles apply to Type 2 hypervisors as well. The processor 12 of the system 10 can execute one or more guest operating systems (O.S.) 60 such as but not limited to a Windows-based or Linux-based operating system. The guest O.S. 60 typically includes a power management module 62 configured for generating calls to place hardware components in a reduced power or "sleep" state in accordance with principles known in the art, typically after the elapse of predetermined idle periods. For example, in a sleep state the processor 12 itself may enter a reduced power mode, and/or a cooling fan in the system 10 may be powered down, etc.

The guest O.S. 60 may be controlled by or otherwise communicate with a hypervisor 66 that can include a respective virtual BIOS module 64 for each guest O.S., with the virtual BIOS module including a virtual advanced configuration power interface (ACPI) to emulate, in virtual space, an ACPI module in the BIOS 46 of the system 10. The hypervisor 66 may signal a device manager module 68, in some embodiments a QEMU manager (in accordance with the QEMU emulation specification) in a privileged domain 70 of the hypervisor. The privileged domain 70, which is configured as an interface of the hypervisor 66 to the user, may also include a shutdown module 72 executing logic in accordance with present principles to ensure orderly placement of the system 10 into a sleep mode in accordance with discussion below. The shutdown module 72 communicates with the BIOS 46 of the system 10 as shown.

Figure 3:
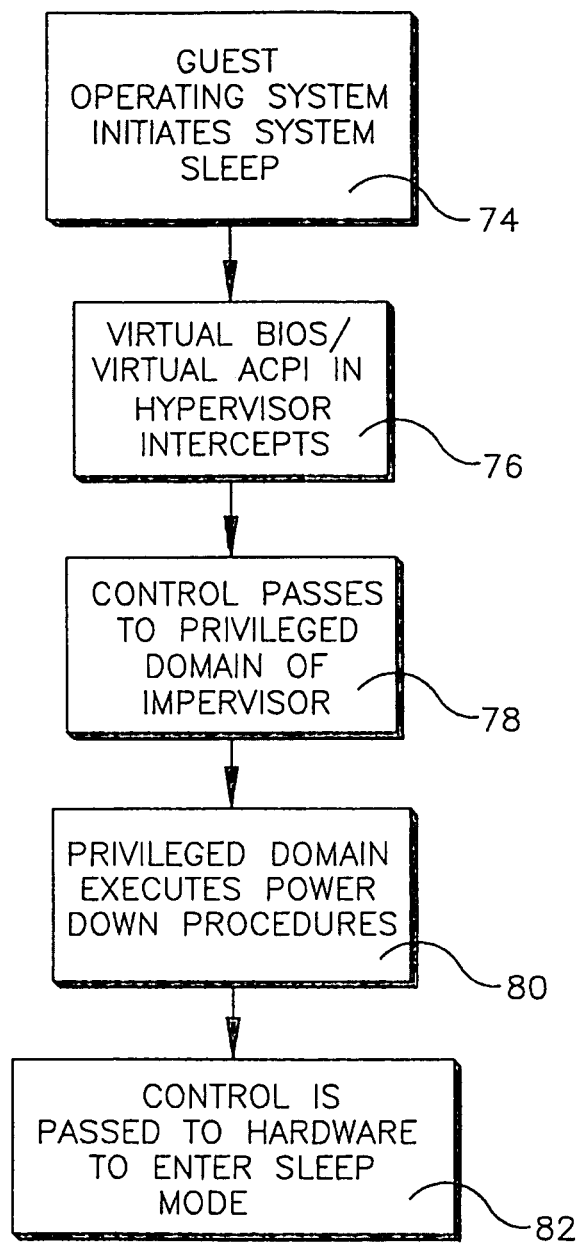
FIG. 3 is a flow chart of non-limiting logic in accordance with present principles.

Now referring to FIG. 3, at block 74 the power management module 62 of the guest O.S. 60, typically after detecting a period of non-user input exceeding a threshold period, initiates a signal for the system 10 to enter a reduced power mode, sometimes referred to as a "sleep" mode. The signal is intercepted by the virtual BIOS module 64 of the hypervisor 66 at block 76. The hypervisor 66 passes control of the system 10 at block 78 to the privileged domain 70, e.g., by passing the signal to the device manager 68. The device manager 68 then executes selected reduced power scripts at block 80 and when the scripts are complete, passes control to the shutdown module 72 of the privileged domain. The shutdown module 72 passes control (along with the system sleep signal) back to the BIOS 46 of the system 10 at block 82 which in response configures the system 10 in a reduced power mode.

In example embodiments, the reduced power scripts executed at block 80 may include, e.g., ensuring cached or pending operations are executed prior to entering the reduced power mode, store computer states as appropriate prior to entering the reduced power mode, etc.

While the particular ESTABLISHING POWER SAVE MODE IN HYPERVISOR SYSTEM is herein shown and described in detail, it is to be understood that the subject matter which is encompassed by the present invention is limited only by the claims.

What is claimed is:

1. A system comprising:
    a processor executing a guest operating system (GOS) within a virtual machine;
    a hypervisor communicating with the GOS and configured to intercept a sleep mode call therefrom, the hypervisor executing at least one reduced power script prior to passing control back to a BIOS associated with the processor for entry into a sleep mode, wherein the hypervisor includes a privileged domain establishing an interface of the hypervisor to a user, the privileged domain including a shutdown module executing logic to ensure orderly placement of the system into a sleep mode in accordance with the sleep mode call, the shutdown module communicating with the BIOS of the system, the hypervisor, after intercepting the sleep mode call, passing control of the system to the privileged domain, the privileged domain executing the at least one reduced power script and when the at least one reduced power script is complete, passing control to the shutdown module, the shutdown module in turn passing control along with the sleep mode call to the BIOS of the system which in response configures the system in a reduced power mode.

2. The system of claim 1, wherein the GOS includes a power management module configured for generating the sleep mode call.

3. The system of claim 1, wherein the hypervisor includes a virtual BIOS module.

4. The system of claim 3, wherein the virtual BIOS module includes a virtual advanced configuration power interface (ACPI).

5. The system of claim 1, wherein the hypervisor includes a device manager module in a privileged domain of the hypervisor.

6. A method comprising:
    using a guest operating system (GOS) to initiate a signal for computer system to enter a reduced power mode;
    intercepting a signal at a hypervisor;
    using the hypervisor to execute at least one reduced power script; then
    passing control of the system from the hypervisor to BIOS of the system to configure the system in the reduced power mode, wherein the reduced power script includes ensuring cached or pending operations are executed prior to entering the reduced power mode.

7. The method of claim 6, wherein the signal is intercepted by the virtual BIOS module of the hypervisor.

8. The method of claim 6, wherein a privileged domain of the hypervisor executes the reduced power script.

9. The method of claim 8, wherein a device manager of the privileged domain executes the reduced power script.

10. The method of claim 6, wherein the reduced power script includes storing at least one computer state prior to entering the reduced power mode.

11. A non-transitory computer readable storage medium that is not a carrier wave and that stores logic executable by a processor of a computer for:
    generating a reduced power mode signal in response to a period of user inactivity of the computer;
    intercepting the reduced power mode signal so that the computer cannot immediately enter the reduced power mode;
    using a hypervisor to execute control functions of the computer in preparation for entering the reduced power mode; and
    passing control of the computer from the hypervisor after the control functions have been completed such that the computer can then and only then enter the reduced power mode, wherein the hypervisor includes a privileged domain establishing an interface of the hypervisor to a user, the privileged domain including a shutdown module executing logic to ensure orderly placement of the system into a sleep mode in accordance with the reduced power mode signal, the shutdown module communicating with BIOS accessible to the processor, the hypervisor, after intercepting the reduced power mode signal, passing control to the privileged domain, the privileged domain executing the control functions and when the control functions are complete, passing control to the shutdown module, the shutdown module in turn passing control along with the reduced power mode signal to the BIOS which in response configures the computer in a reduced power mode.

12. The computer readable storage medium of claim 11, wherein the reduced power mode signal is generated by a guest operating system (GOS) including a power management module configured for generating the reduced power mode signal.

13. The computer readable storage medium of claim 11, wherein the hypervisor includes a virtual BIOS module.

14. The computer readable storage medium of claim 13, wherein the virtual BIOS module includes virtual advanced configuration power interface (ACPI).

15. The computer readable storage medium of claim 11, wherein the hypervisor includes a device manager module in a privileged domain of the hypervisor.

16. The computer readable storage medium of claim 15, wherein the privileged domain communicates with the BIOS.

* * * * *